(12) United States Patent
Good

(10) Patent No.: US 8,141,144 B2
(45) Date of Patent: Mar. 20, 2012

(54) SECURITY POLICY MANAGEMENT FOR NETWORK DEVICES

(75) Inventor: Gordon Good, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 09/852,244

(22) Filed: May 10, 2001

(65) Prior Publication Data

US 2002/0169975 A1 Nov. 14, 2002

(51) Int. Cl.
*H04L 29/06* (2006.01)

(52) U.S. Cl. ............ 726/14; 726/12; 713/154; 713/155

(58) Field of Classification Search .......... 713/200–202, 713/154, 155, 162; 702/224–229; 726/2, 726/12, 30, 14; 710/39; 709/220, 225; 717/176
See application file for complete search history.

(56) References Cited

U.S. PATENT DOCUMENTS

| | | | | |
|---|---|---|---|---|
| 5,832,503 A * | 11/1998 | Malik et al. | .................... | 709/223 |
| 6,158,010 A * | 12/2000 | Moriconi et al. | ................. | 726/1 |
| 6,502,140 B1 * | 12/2002 | Boivie | .......................... | 709/238 |
| 6,678,827 B1 * | 1/2004 | Rothermel et al. | ........... | 713/201 |
| 6,738,908 B1 * | 5/2004 | Bonn et al. | ........................ | 726/4 |
| 6,748,436 B1 | 6/2004 | Anand et al. | | |
| 6,760,761 B1 * | 7/2004 | Sciacca | ........................ | 709/220 |
| 6,839,766 B1 * | 1/2005 | Parnafes et al. | ............... | 709/232 |
| 6,952,768 B2 * | 10/2005 | Wray | ........................... | 713/152 |
| 6,978,301 B2 * | 12/2005 | Tindal | ............................ | 709/223 |
| 7,054,924 B1 * | 5/2006 | Harvey et al. | ................. | 709/220 |
| 7,380,008 B2 * | 5/2008 | Teng et al. | .................... | 709/227 |

* cited by examiner

*Primary Examiner* — Eleni Shiferaw
*Assistant Examiner* — Paul Callahan

(57) ABSTRACT

The present invention provides a system and method for use within a computer network that allows for automated provisioning, configuration, and maintenance of the servers and other devices connected to a computer network in accordance with established policies. This system and method make use of templates which represent security polices which are applicable to all devices within the system, a subset of the devices, or a particular type of device. In addition, the template structure includes conditional statements which allows for flexibility in defining the policies.

34 Claims, 5 Drawing Sheets

SECURITY POLICY MANAGEMENT FOR NETWORK DEVICES

FIELD OF THE INVENTION

The present invention is directed to a distributed network having multiple servers and other devices that are provisioned or configured for support and hosting of sites and/or resources on the Internet, intranets, and other communications networks. More particularly, the present invention is directed to a system and methods for using machine-readable descriptions of established policies and information stored in one or more databases to provision login accounts on multiple computing devices within a network.

BACKGROUND OF THE INVENTION

The growing popularity and increasing accessibility of the Internet has resulted in its becoming a major source of information, as well as a vehicle for inter-party transactions, in a variety of environments. For instance, a number of different types of entities, from government agencies to school systems and other organized groups, host Internet and/or intranet websites that provide information about themselves and topics related to their interests. Similarly, commercial enterprises employ websites to disseminate information about their products or services, as well as conduct commercial transactions, such as the buying and selling of goods. To support these activities, each website requires an infrastructure that stores the information provided by that site, responds to user requests for the information, and conducts other types of transactions appropriate to the site. A significant component of this infrastructure is a web server, which receives requests for information, retrieves it from the appropriate sources, and provides it to the requester. Websites which provide more complex services, such as on-line ordering, may also include application servers to support each additional function.

In the case of a relatively small entity, the infrastructure to support a website may be as simple as a single server, or even a portion of the server. Conversely, a large popular website that consists of several thousand pages of information and that is accessed quite frequently may require numerous servers to provide the necessary support. Similarly, websites for commercial entities, through which transactional operations are conducted, may employ multiple application servers to support transactions with a large number of customers at a time.

While an entity may create and support its own "website", some entities may desire to have their websites supported by an organization that specializes in such a service, such as a managed service provider. In such a situation, employees of the various entities may require access to the servers and other devices that support their respective websites, for example to update content, perform routine maintenance, etc. At the same time, personnel at the support organization also require access to these devices, to upgrade, reconfigure or retire components of the infrastructure. When a single organization is responsible for supporting the data of multiple entities, and different groups of people require access to that data, a problem may arise in supporting the individual needs of each of the various entities. For example, each of the respective entities can have specific policies or procedures with regard to their respective information. For example, security polices may be established which define who has permission to access what information. Such a security policy can establish that a particular individual has the authority to access all devices associated with a particular entity, whereas other individuals such as developers may only be authorized access to a subset of the devices associated with the entity.

Prior to the present invention, a common solution was to manually configure each device. For example, each device was configured with access lists or user-password pairs which identified who had access to the device. This solution, while providing some data security, has its limitations. For example, when the system requires updating, it can be difficult to find all of the instances of, for example, the user-password pairs, leaving the system vulnerable to unauthorized access. Furthermore, the infrastructure required to support large websites may include numerous computing devices, such as web servers, database servers, and application servers, resulting in significant efforts in maintaining the current data.

Accordingly, it is desirable to provide a system and method for configuring computing devices within the context of a multi-party communications network that provides sufficient flexibility to accommodate the different needs of each of the entities who provide services by way of the network, while providing the ability to update the needs of each entity as they change.

SUMMARY OF THE INVENTION

In accordance with the present invention, the foregoing objectives are achieved by means of machine-readable descriptions, identified herein as account templates, which represent policies applicable to all of the computing devices within a network, polices applicable to only a subset of the computing devices, and/or polices applicable to an individual computing device with in the network.

These and other features of the invention are explained in greater detail hereinafter with reference to an exemplary embodiment of an invention illustrated in the accompanying drawings.

DETAILED DESCRIPTION

To facilitate an understanding of the principles of the present invention, it is described hereinafter with reference to its application in a computer network, of a type wherein a support organization (such as a managed service provider, or MSP) provides the infrastructure and support for websites and other network resources of multiple entities, referred to hereinafter as customers. For additional discussion of such a network, reference is made to co-pending, commonly assigned application Ser. No. 09/841,008, filed on Apr. 25, 2001, the disclosure of which is incorporated herein by reference.

The present invention is herein described with reference to the implementation of security polices, more specifically to definition of who is authorized to access what devices. It will be appreciated, however, that the implementation of the invention that is described hereinafter is merely exemplary, and that the invention can find practical application in any environment where a policy structure is established for multiple computing devices within the network.

Figure 1:
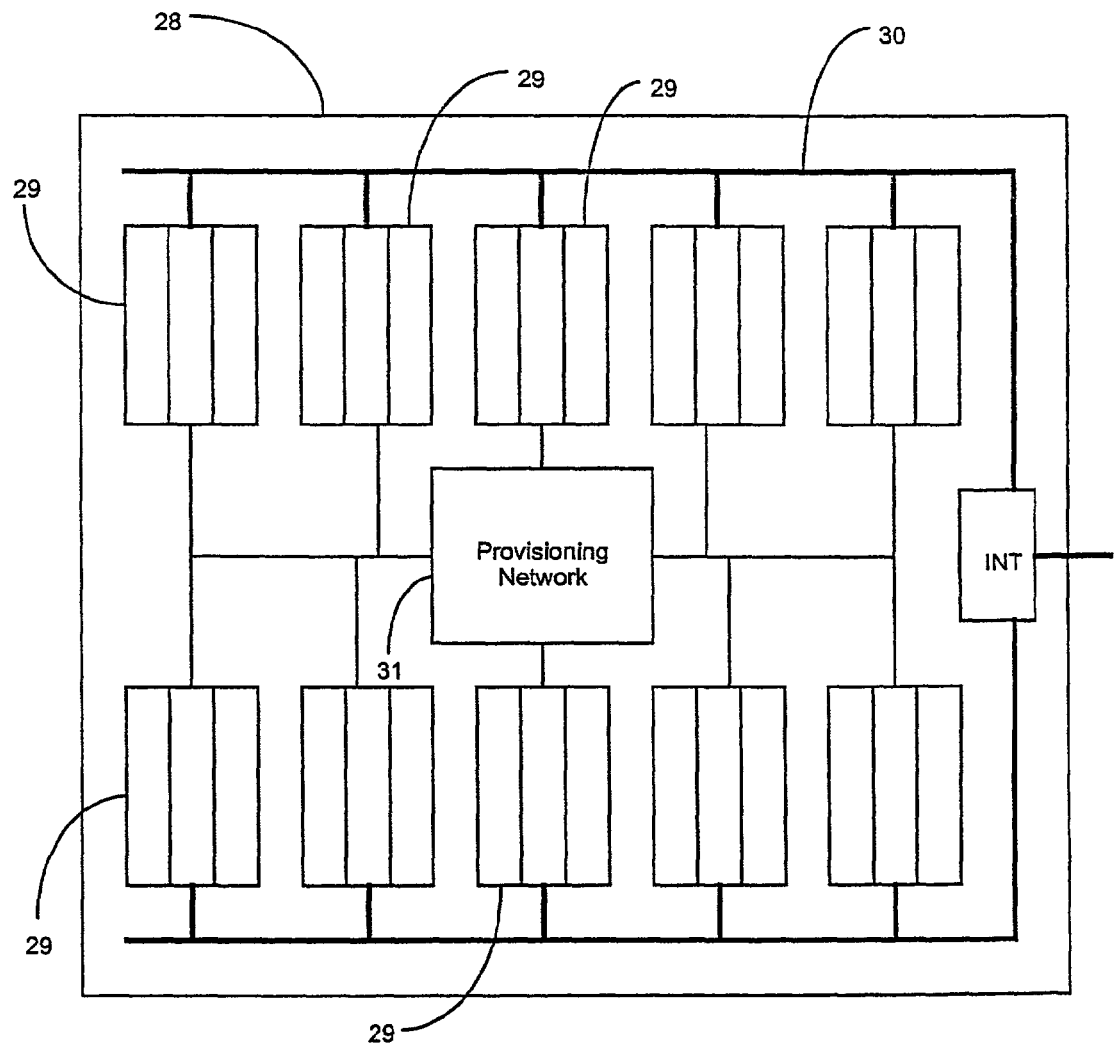
FIG. 1 is an overview of an environment in which an embodiment of the invention can be implemented.
Figure 2:
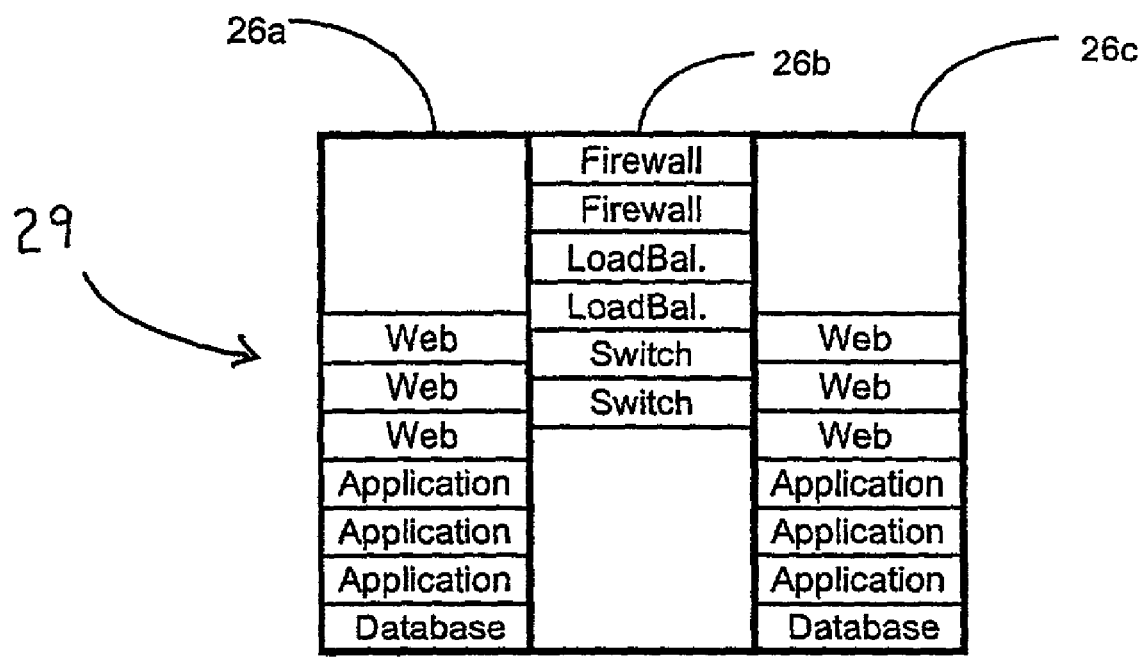
FIG. 2 is a block diagram of one embodiment of a hardware configuration for a web site in a data center.

FIG. 1 is an overview of an environment in which an embodiment of the present invention can be implemented. A data center 28 is partitioned into multiple customer compartments 29, each of which may be arranged as shown in FIG. 2. This exemplary configuration comprises two outer racks 26a and 26c of servers which implement the business logic of a customer's web site, and a central rack 26b of network devices which connect the servers to the outside world. Returning to FIG. 1, each compartment is connected to a backbone 30 or similar type of common communication line for access by computers which are external to the data center. For instance, if the compartments are associated with Internet web sites, the backbone 30 constitutes the physical communication path via which end users access those sites over the Internet. The backbone may also form the path via which the web site hosts can securely communicate with the devices in their individual compartments, for instance by virtual private networks.

Also located in the data center 28 is a provisioning and management network 31. This network is connected to the computing devices in each of the compartments 29 which are to be managed. The provisioning network 31 is illustrated in FIG. 1 as being connected to the compartments 29 by a network which is separate from the backbone 30; however, the provisioning network can alternatively communicate with the compartments over the backbone, using a secure communications protocol.

The provisioning network 31 may be operated by the owner of the data center, or by a third-party MSP. While FIG. 1 illustrates all of the compartments being connected to the network 31, this need not be the case. To this end, multiple provisioning networks may be located in the data center, with each one operated by a separate entity to provision and manage the devices in different ones of the compartments 29. In accordance with the present invention, the network 31 automatically controls the provisioning and management of the computing devices in each compartment associated with that network.

To automate the provisioning of servers and related types of devices, an agent is installed on each device that is controlled by the network 31, to handle the retrieval and loading of software onto the device. The agent communicates with the provisioning network 31 to obtain commands regarding tasks that need to be performed on its device, as well as obtain the software components that are to be installed as part of the provisioning process.

Figure 3:
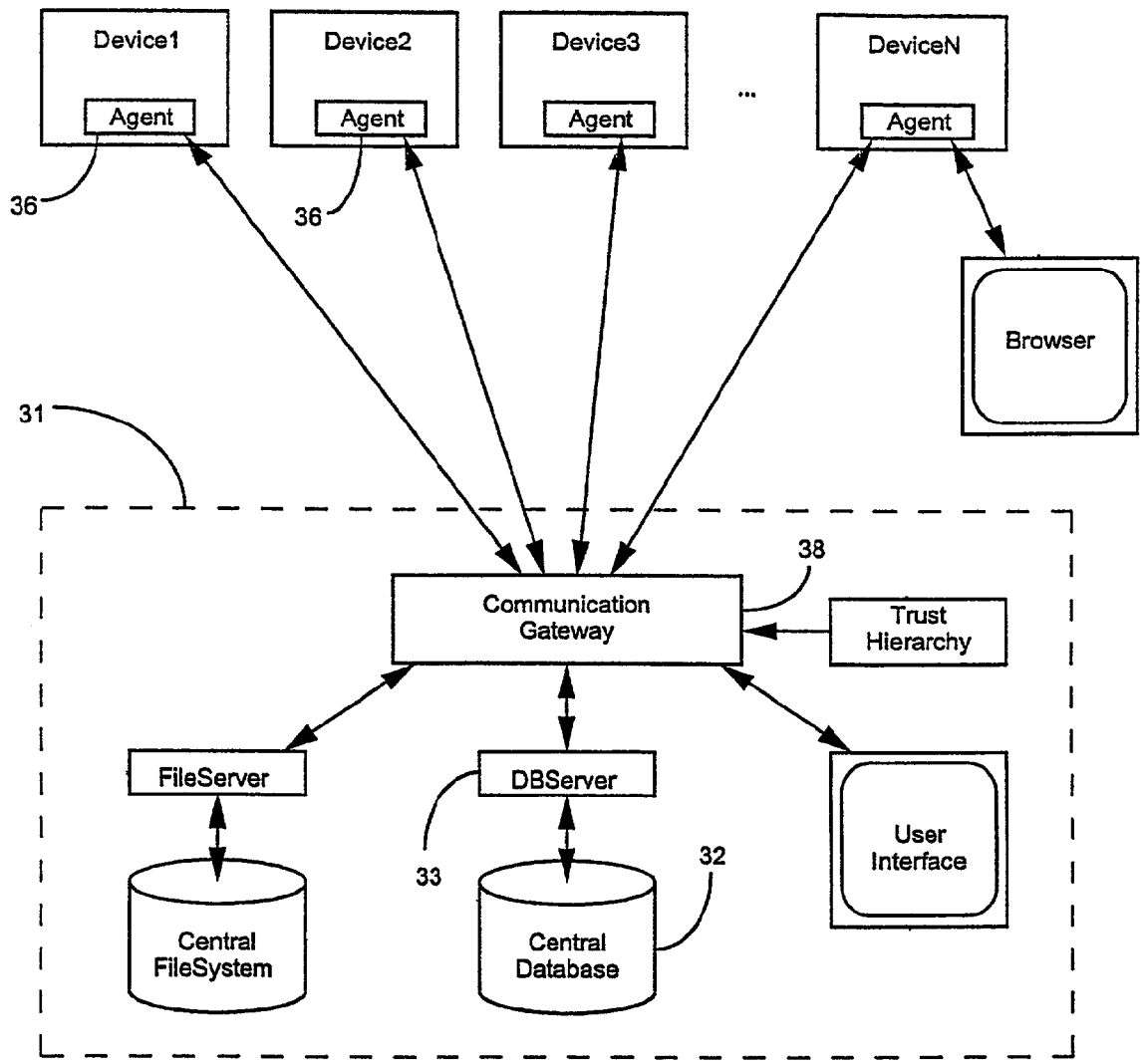
FIG. 3 is a block diagram of a provisioning framework in which an embodiment of the invention can be implemented.

One example of a provisioning network 31 that communicates with the agents on individual devices, to perform automated provisioning, is illustrated in FIG. 3. Two fundamental functions are implemented by the provisioning network. One of these functions is to maintain information about, and manage, all of the devices that are associated with the provisioning system. The second function is to store and provide the software that is loaded on these devices. The first function is implemented by means of a central database 32, that is accessed via a database server 33. This database comprises a repository of all pertinent information about each of the devices that are connected to the provisioning network. Hence, depending upon the extent of the provisioning system, the central database might contain information about devices in only a few web site compartments, or an entire data center, or multiple data centers. The information stored in this database comprises all data that is necessary to provision a device. For instance, it can include the hardware configuration of the device, e.g., type of processor, amount of memory, interface cards, and the like, the software components that are installed on the device along with the necessary configuration of each of those components, and logical information regarding the device, such as its IP address, the web site with which it is associated, services that it performs, etc. For a detailed discussion of an exemplary model of such a database for storing all of the relevant information, reference is made to co-pending application Ser. No. 09/699,353, filed on Oct. 31, 2000, the disclosure of which is incorporated herein by reference. In essence, the information stored in the database constitutes a model for each device that is managed by the provisioning system, as well as the interconnection of those devices.

To further enhance the security of the communications between the provisioning network and the agents, the network includes a central gateway 38 for communications. The gateway 38 functions as the focal point for all communications, and converts the policies established through the user interface into the appropriate primitives to implement the provisioning process, by means of SQL statements to the database and XML-RPC messages to the remote agents 36 on the devices. By separating the process considerations entered by management personnel from the basic level operation, these two aspects of provisioning can be individually customized and revised, as desired.

According to an exemplary embodiment of the invention, three levels or categories of templates are created (global, customer, and server) in order to allow the support organization the flexibility to implement its security policies as well as the policies of the individual customers. A global template is created in order to reflect the polices of the support organization i.e., policies which are applicable to all the devices maintained by the provisioning network. For example, a global security policy may indicate that certain individuals or groups of individuals have access to all the devices supported by the network or that all database servers are accessible by the database administrator.

Customer templates are created in order to reflect the policies of a particular customer i.e., policies which only affect a subset of the devices maintained by the provisioning network. For example, the security policy of a particular customer may indicate that certain individuals or managers have access to historical or financial data, or that web developers have access to web servers but not database servers. The customer template, like the server template discussed below, usually augments the global template; however, a flag can be set to indicate that the global template is not to be inherited.

Server templates are created in order to further augment the customer template by reflecting policies which are applicable to a particular type of device within a customer compartment, e.g., a database, web server, or application server.

As mentioned above, the customer template usually augments the global template, i.e., the customer template inherits the global policies. This results in there generally being one global policy, for example, for access security, and additional access security policies for each customer and/or device, wherein the customer template inherits the global template policies and the server templates inherits the customer template polices. However, certain customers may not wish to implement the global policy or a global policy may conflict with a customer-specific policy. Therefore, the present invention provides the ability to disable the inheritance feature. This is achieved by setting a meta-flag to disable the inheritance feature. For example, the flag can simply set an inherit users/groups state to true or false. In addition to disabling the inherit feature in the customer template, the feature may also be disabled in the server template as well. Accordingly, the present invention provides flexibility at both the customer and device level.

Each level or category of template described above is created with the same structure, differing only in the policies which they reflect. For example, a template reflecting security polices can define (1) a specific user or group, (2) a pointer to external information which defines a list of users or a role, and/or (3) conditional statements. Therefore, the data structure of an exemplary security policy template is as follows.

```
<accounttemplate >
    <user>
        <uid>ggood</uid>
        <gecos>Gordon Good</gecos>
        <uidnumber>5725</uidnumber>
        <gidnumber>1002</gidnumber>
        <home directory>/home/ggood</homedirectory>
        <userpassword xform="CRYPT">*LK*</userpassword >
        <loginshell>/bin/csh</loginshell>
    </user>
    <extuser>uid=sean, ou=people, o=abcinc.com</extuser >
    <if name="SERVICE"value="DATABASE">
        <extrole>cn=ABCInc DBAm ou=roles , o=abcinc.com</extrole >
    </if>
</accounttemplate>
```

The ability to define external users or roles allows the template to point to a source external to the template which provides information during expansion of the template. For example, if a template points to the external role of developer, then only a single list of all individuals assigned the role of developer need be created and maintained, for example in the database 32. Accordingly, if an individual changes positions (roles) or leaves the company, only the list of individuals assigned as developers need be updated.

The ability to establish conditionals in the template provides flexibility in defining the policies the template is to reflect. For example, assume that the security policy of the support organization states (1) that two particular users, Gordon and Paul are to have access to all devices maintained by the provisioning network, (2) all database servers are to be accessible by the database administrator, (3) all system developers are to have access to the devices maintained by the Host, and (4) all account representatives are to have access to the devices associated with their respective customers. Prior to the present invention, each device would have to be manually configured to allow access to Gordon, Paul, and to every individual assigned the role of developer. In addition, it would have to be determined, for each device, whether or not the database administer or an account manager should have access. Further, should there be a change, for example a new database administer is hired or an account manager changes, each device would have to be updated. However, according to the present invention, a single global template is created which defines Paul and Gordon as specific users, developers as an external role, and the database administrator and the account developers as conditionals. Accordingly, the list of individual developers need only be input once at the location specified in the template.

Figure 4A:
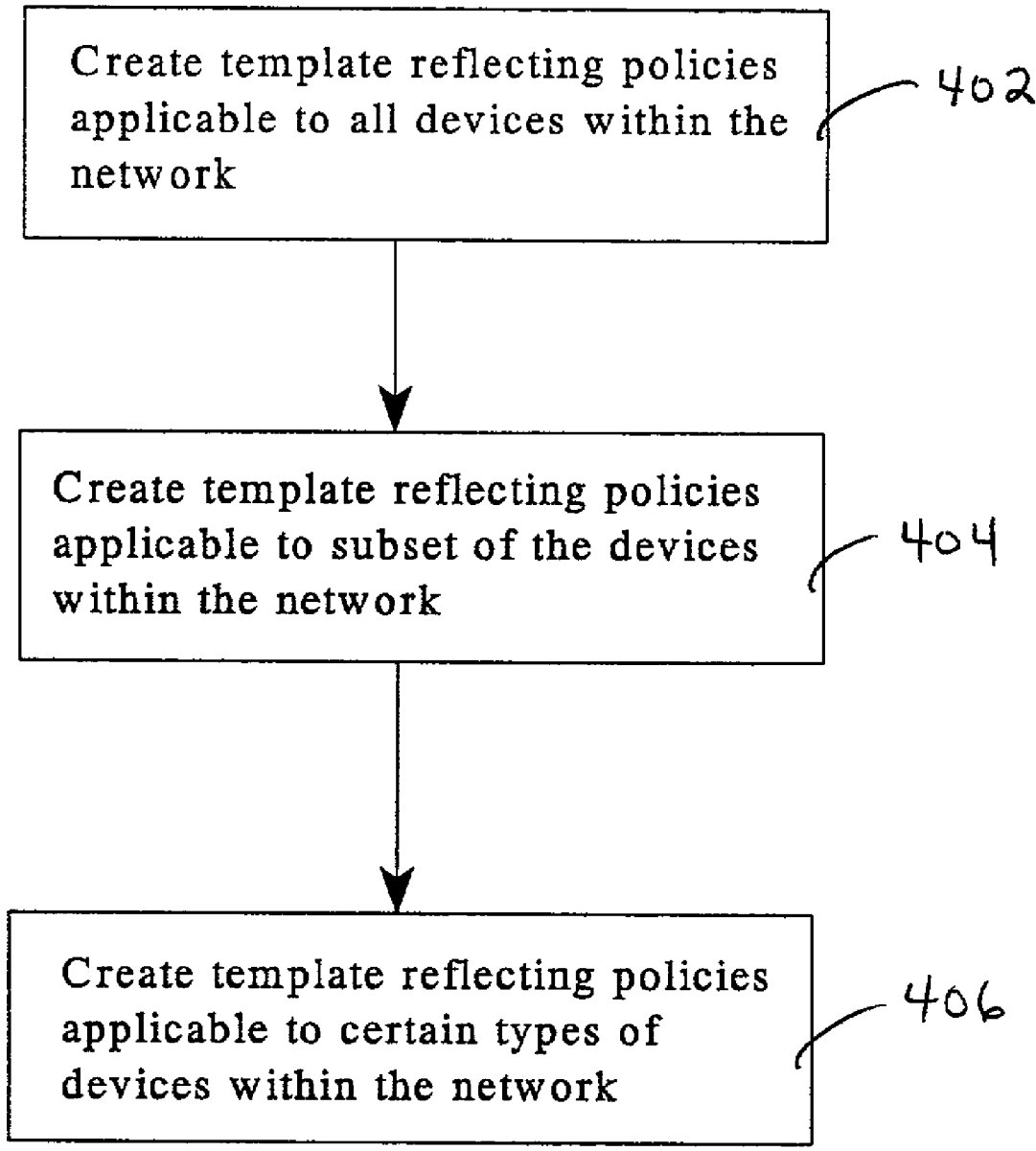
FIGS. 4a-4b are flow diagrams describing the creation and implementation of templates according to an embodiment of the present invention.
Figure 4B:
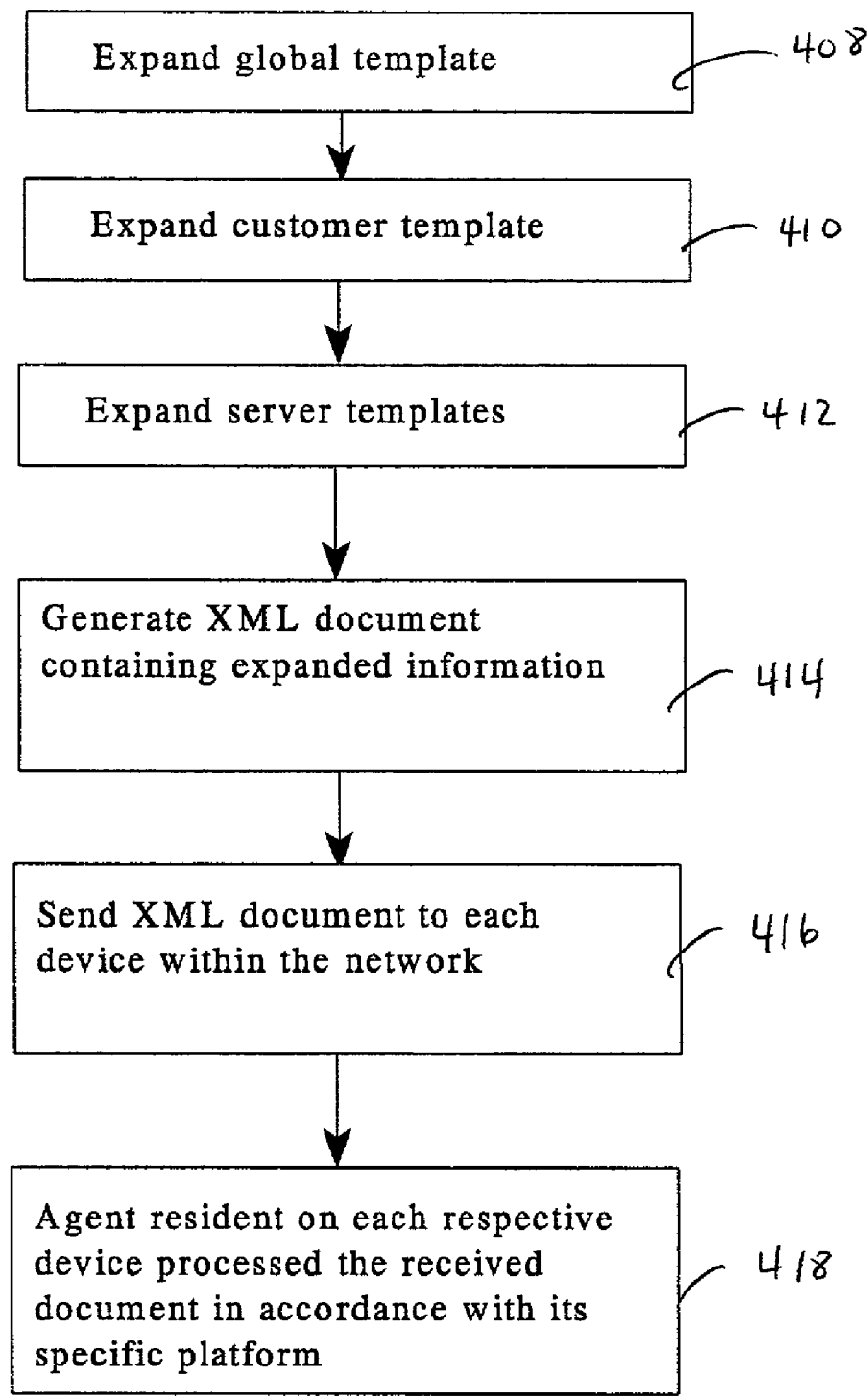

FIGS. 4a and 4b illustrate flow charts associated with the creation and use of templates in accordance with the present invention. As shown in FIG. 4a, a global template reflecting the policies applicable to all devices with in the network is created at step 402. At step 404, customer templates, or templates representing policies applicable to a subset of the devices is defined. Finally, at step 406, server templates, or templates reflecting policies applicable to certain types of devices are defined.

During provisioning of a device or in order to update the account information, the templates are expanded to create an XML document which contains, for example, the access lists as shown in FIG. 4b. At step 408, the global template is expanded and any external data is retrieved. Then at step 410, the customer template is expanded if applicable as is the server template at step 412. An XML document containing the expanded information is created, at step 414 and sent to each device. The agent resident on each respective device receives the XML document and interprets the information for its specific platform, for example Unix, Solaris etc., at step 418.

The present invention exhibits various advantages. For example, the account template is not directly accessed by each of the customer compartments or each server, but rather account information is sent to each provisioned device, by way of expanded information, which makes a copy and stores the account information locally. This allows the provisioned device to respond to login requests autonomously, without involvement of the provisioning services. This avoids delays or denials of access if there is congestion or malfunction in the communication path between any of the devices and the communication gateway. Additionally, the centrality of the account template, and expanding the information in the individual devices, allows for a support organization to change the account template at a single location, and the changes are distributed by way of expansion within the customer devices.

The foregoing description has been provided in the context of a system and method for providing account management within a network having the ability for automated provisioning, maintenance, and configuration of servers connected to a communication network. It will be appreciated by those of ordinary skill in the art that the present invention can be embodied in other forms without departing from the spirit or characteristics thereof. For instance, while an exemplary embodiment of the present invention has been described in the context of having a single host data server, it is fully contemplated that multiple host data centers could be employed using the system and method of the present invention. In such a system, multiple host data centers communicate with a single location that stores the master policy and directory structure. Precautions are taken to ensure that each host data center would have an up-to-date version of the directory structure contained within the central master directory structure data center.

The foregoing description is, therefore, considered in all aspects to be illustrative and not restrictive. The scope of the invention is indicated by the following claims and all changes that come within the meaning and range of equivalents are therefore intended to be embraced therein.

What is claimed is:

1. A method for automatically provisioning a plurality of computing devices in accordance with established policies, the method comprising the steps of:

creating a plurality of templates reflecting said policies;

expanding at least one template at a central location to create a document comprising expanded information; and sending from the central location the document comprising the expanded information to said plurality of computing devices wherein each of the plurality of templates includes a conditional statement that determines whether a template is to be expanded with predetermined information on the basis of whether or not the computing device to which said expanded information is to be provided meets the condition.

2. The method of claim 1, further comprising interpreting the expanded information by agents which are respectively resident on each of said plurality of computing devices.

3. The method of claim 1, wherein the plurality of templates includes a first category of templates that reflect policies applicable to all of the plurality of computing devices.

4. The method of claim 3, wherein the plurality of templates includes a second category of templates that reflect policies applicable to only a subset of the plurality of computing devices.

5. The method of claim 3, wherein the plurality of templates includes another category of templates that reflect policies applicable to only a particular type of the plurality of computing devices.

6. The method of claim 1, wherein said policies are security polices regarding user access to each of the plurality of computing devices.

7. The method of claim 1, wherein at least one template includes a reference to information external to the template, and wherein said expanding step comprises creating the document that includes information contained in the template and said external information.

8. The method of claim 7, wherein said document is an XML document.

9. The method of claim 7, wherein said external information comprises a list of users.

10. A system for automatically provisioning a plurality of computing devices in accordance with established policies, the system comprising:
    a database system which stores a plurality of templates which reflect said polices;
    a plurality of agents which are respectively resident on each of said plurality of computing devices, and which communicate with said database system to obtain information with regard to provisioning and maintenance of the respective computing devices; and
    a communications gateway through which communication messages are exchanged between said agents and said database system, wherein said communications gateway is configured to:
    retrieve individual ones of the plurality of templates;
    expand the retrieved templates to create respective documents containing combined template information and expanded information; and
    provide the documents containing the combined template information and expanded information to said plurality of agents;
    wherein at least one of the templates are configured to selectably incorporate a policy defined only by a different template.

11. The system of claim 10, wherein the structure of said plurality of templates includes conditional statements that determine whether a template is to be expanded with predetermined information on the basis of the computing device to which the expanded information is being provided.

12. The system of claim 11, wherein the plurality of templates included a first category of templates that reflect policies applicable to all of the plurality of computing devices.

13. The system of claim 12, wherein the plurality of templates includes a second category of templates that reflect policies applicable to a subset of the plurality of computing devices.

14. The system of claim 12, wherein the plurality of templates includes another category of templates that reflect policies applicable to a particular type of the plurality of computing devices.

15. The system of claim 11 wherein said communications gateway expands a template to include information contained in a conditional statement only if the computing device to which said expanded information is to be provided meets the condition.

16. The system of claim 10, wherein said policies are security polices regarding user access to each of the plurality of computing devices.

17. The system of claim 10, wherein at least one template includes a reference to information external to the template, and wherein said communication gateway expands the template by creating a document that includes information contained in the template and said external information.

18. The system of claim 17 wherein said document is an XML document.

19. The system of claim 17 wherein said external information comprises a list of users.

20. A method of controlling user access to networked computing devices, comprising the steps of:
    storing a plurality of templates that identify user-access policies for respective ones of said devices, at least one of said templates including a reference to information that is external to the template;
    retrieving a template that pertains to a given one of said devices and creating a document at a central location comprising a listing of users identified in said template and users identified by any externally referenced information; and
    sending said document from said central location to the given one of said devices;
    configuring at least one of the templates to selectably incorporate a policy defined only by a different template.

21. The method of claim 20 wherein said external information comprises a list of users.

22. The method of claim 21 wherein all of the users on said list perform a specified role relative to said computing devices.

23. The method of claim 20 wherein at least one of said templates includes a conditional statement, and the step of creating a document comprises including information from said conditional statement in said document only if said given device meets the condition.

24. The method of claim 20, wherein said plurality of templates are classified into at least two categories, wherein a template in a first category pertains to all of the computing devices, and a template in a second category pertains to a subset of said computing devices.

25. The method of claim 24, wherein a template in said second category inherits policies contained in a template of said first category.

26. The method of claim 25, wherein said inheritance can be selectively disabled.

27. The method of claim 25, further including a third category of templates that pertain to specific devices and inherit policies from templates in said second category.

28. The method of claim 20, wherein said document is an XML document.

29. A method for controlling user access to networked computing devices, comprising the steps of:
    storing a plurality of templates that identify user-access policies for respective ones of said devices, at least one of said templates including a conditional statement;

retrieving a template that pertains to a given one of said devices and creating a document at a central location comprising a listing of users identified in said template, and users identified in any conditional statement if said given device meets the condition; and sending said document from said central location to the given one of said devices;

configuring at least one of the templates to selectably incorporate a policy defined only by a different template.

30. The method of claim 29, wherein said document is an XML document.

31. The method of claim 29, wherein said plurality of templates are classified into at least two categories, wherein a template in a first category pertains to all of the computing devices, and a template in a second category pertains to a subset of said computing devices.

32. The method of claim 31, wherein a template in said second category inherits policies contained in a template of said first category.

33. The method of claim 32, wherein said inheritance can be selectively disabled.

34. The method of claim 32, further including a third category of templates that pertain to specific devices and inherit policies from templates in said second category.

* * * * *

UNITED STATES PATENT AND TRADEMARK OFFICE
CERTIFICATE OF CORRECTION

PATENT NO. : 8,141,144 B2
APPLICATION NO. : 09/852244
DATED : March 20, 2012
INVENTOR(S) : Gordon Good Page 1 of 1

It is certified that error appears in the above-identified patent and that said Letters Patent is hereby corrected as shown below:

In column 6, line 64, in Claim 1, delete "devices" and insert -- devices; --, therefor.

In column 7, line 20, in Claim 6, delete "polices" and insert -- policies --, therefor.

In column 7, line 36, in Claim 10, delete "polices;" and insert -- policies; --, therefor.

In column 7, line 62, in Claim 12, delete "included" and insert -- includes --, therefor.

In column 8, line 11, in Claim 16, delete "polices" and insert -- policies --, therefor.

Signed and Sealed this
Sixth Day of November, 2012

David J. Kappos
*Director of the United States Patent and Trademark Office*